US009361528B2

(12) United States Patent
Nonaka et al.

(10) Patent No.: US 9,361,528 B2
(45) Date of Patent: Jun. 7, 2016

(54) VEHICLE-TO-VEHICLE DISTANCE CALCULATION APPARATUS AND METHOD

(71) Applicant: FUJIFILM Corporation, Tokyo (JP)

(72) Inventors: Shunichiro Nonaka, Tokyo (JP); Yuko Matsui, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 141 days.

(21) Appl. No.: 14/169,838

(22) Filed: Jan. 31, 2014

(65) Prior Publication Data
US 2014/0241578 A1 Aug. 28, 2014

(30) Foreign Application Priority Data

Feb. 28, 2013 (JP) .................................. 2013-038685

(51) Int. Cl.
G06K 9/00 (2006.01)
G06T 7/00 (2006.01)
G06T 7/60 (2006.01)
G06K 9/32 (2006.01)

(52) U.S. Cl.
CPC .......... *G06K 9/00805* (2013.01); *G06K 9/3241* (2013.01); *G06T 7/0051* (2013.01); *G06T 7/602* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| 5,555,555 | A | * | 9/1996 | Sato et al. | 382/104 |
| 2002/0001398 | A1 | * | 1/2002 | Shimano et al. | 382/104 |
| 2002/0026274 | A1 | * | 2/2002 | Morizane et al. | 701/93 |
| 2007/0035385 | A1 | * | 2/2007 | Miyahara | 340/435 |
| 2007/0047809 | A1 | * | 3/2007 | Sasaki | 382/170 |
| 2007/0127779 | A1 | * | 6/2007 | Miyahara | 382/106 |
| 2007/0171121 | A1 | * | 7/2007 | Munakata | 342/55 |
| 2008/0062010 | A1 | * | 3/2008 | Kobayashi et al. | 340/937 |
| 2009/0041302 | A1 | * | 2/2009 | Nagaoka et al. | 382/103 |
| 2012/0093372 | A1 | | 4/2012 | Liu | |
| 2014/0293052 | A1 | * | 10/2014 | Kuehnle et al. | 348/148 |
| 2015/0092988 | A1 | * | 4/2015 | Mitoma et al. | 382/104 |

FOREIGN PATENT DOCUMENTS

| GB | 2462071 A | 1/2010 |
| JP | 61-155909 A | 7/1986 |
| JP | 06-229759 * | 8/1994 |
| JP | 06-229759 A | 8/1994 |

(Continued)

OTHER PUBLICATIONS

Japanese Office Action dated Dec. 24, 2014 with an English translation thereof.

(Continued)

*Primary Examiner* — Wenpeng Chen
(74) *Attorney, Agent, or Firm* — McGinn IP Law Group PLLC

(57) ABSTRACT

The distance to a target vehicle is calculated. To achieve this, a target vehicle traveling ahead is imaged and it is determined to what vehicle group, such as a light-duty vehicle group, standard passenger car group or heavy-duty vehicle group, the image of the target vehicle belongs. Representative vehicle widths are stored in a vehicle group table on a per-vehicle-group basis. The distance from one's own vehicle to a target vehicle is calculated using the vehicle width that corresponds to the vehicle group decided.

16 Claims, 6 Drawing Sheets

(56) References Cited

FOREIGN PATENT DOCUMENTS

| | | | |
|---|---|---|---|
| JP | 07-111712 A | | 4/1995 |
| JP | 11-166811 A | | 6/1999 |
| JP | 2002-327635 A | | 11/2002 |
| JP | 2002327635 A | * | 11/2002 |
| JP | 2004301833 A | * | 10/2004 |
| JP | 2005-321872 A | | 11/2005 |
| JP | 2006146754 A | * | 6/2006 |
| JP | 2006-329776 A | | 12/2006 |
| JP | 2007-015525 A | | 1/2007 |
| JP | 2007155469 A | * | 6/2007 |
| JP | 2008-055943 A | | 3/2008 |
| JP | 2010-019589 A | | 1/2010 |
| JP | 2011-150417 A | | 8/2011 |

OTHER PUBLICATIONS

Chinese Office Action dated Nov. 26, 2015 with an English translation.

* cited by examiner

Fig. 4

| VEHICLE GROUP | VEHICLE WIDTH |
|---|---|
| LIGHT-DUTY VEHICLE | w1 |
| STANDARD PASSENGER CAR | w2 |
| HEAVY-DUTY VEHICLE (TRUCK, BUS) | w3 |
| MOTORCYCLE | w4 |
| BICYCLE | w5 |

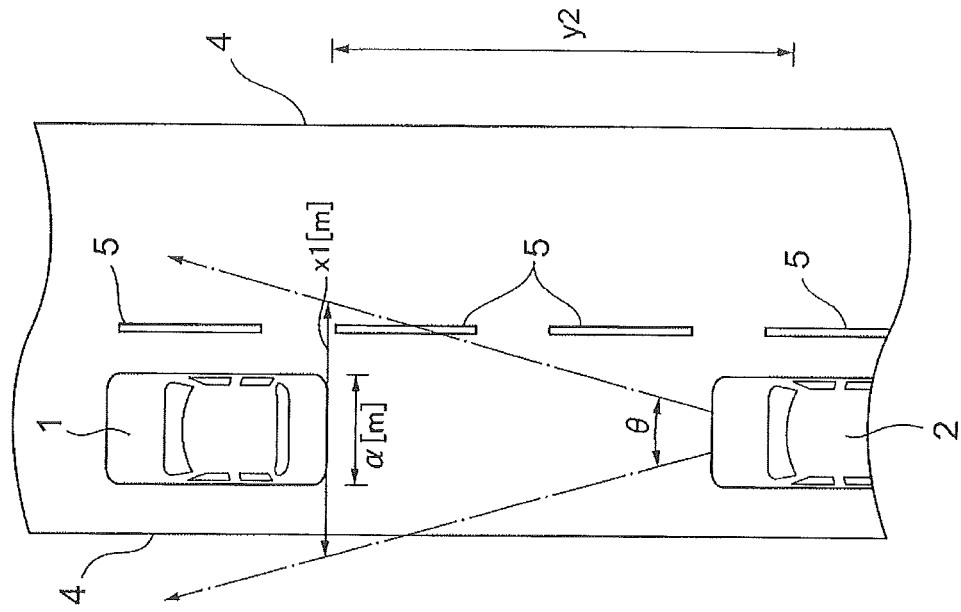
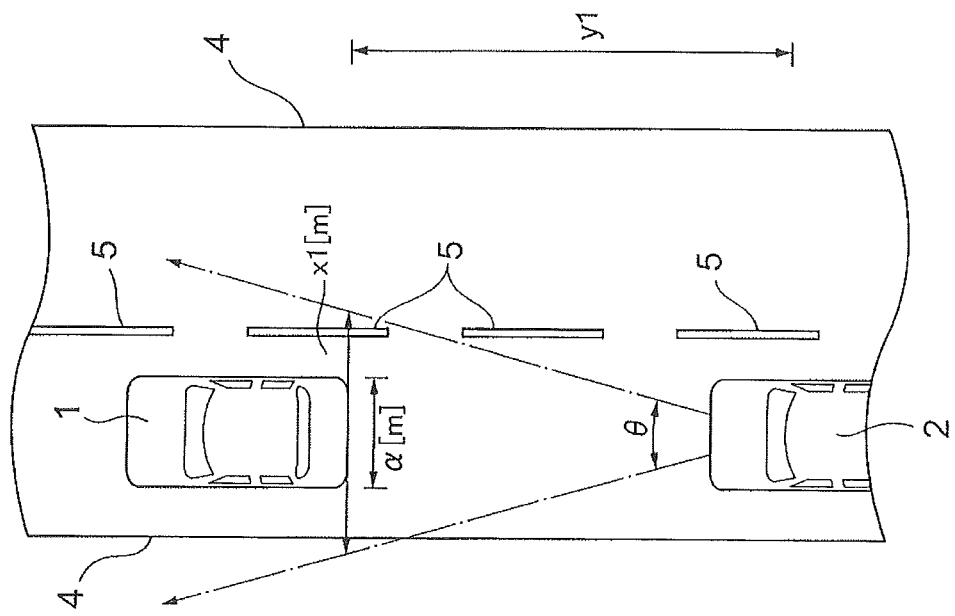

VEHICLE-TO-VEHICLE DISTANCE CALCULATION APPARATUS AND METHOD

BACKGROUND OF THE INVENTION

1. Field of the Invention

This invention relates to a vehicle-to-vehicle distance calculation apparatus and method.

2. Description of the Related Art

Calculation of vehicle-to-vehicle distance is important in order to prevent vehicular accidents. In order to achieve this, systems are available such as one that detects, say, the license plate of the vehicle traveling ahead and calculates the distance to that vehicle (Patent Documents 1 to 3). Various other approaches have been considered as well (Patent Documents 4 to 9).

[Patent Document 1]: Japanese Patent Application Laid-Open No. 61-155909

[Patent Document 2]: Japanese Patent Application Laid-Open No. 2007-15525

[Patent Document 3]: Japanese Patent Application Laid-Open No. 6-229759

[Patent Document 4]: Japanese Patent Application Laid-Open No. 2011-150417

[Patent Document 5]: Japanese Patent Application Laid-Open No. 2010-19589

[Patent Document 6]: Japanese Patent Application Laid-Open No. 7-111712

[Patent Document 7]: Japanese Patent Application Laid-Open No. 11-166811

[Patent Document 8]: Japanese Patent Application Laid-Open No. 2002-327635

[Patent Document 9]: Japanese Patent Application Laid-Open No. 2005-321872

However, all of the techniques set forth in Patent Documents 1 to 9 are unsatisfactory in terms of lowering cost of development and shortening processing time. In Patent Document 3, for example, vehicle-to-vehicle distance is calculated using the width of a vehicle in an image, but since vehicle width differs from vehicle to vehicle, this makes it necessary to store the width of all vehicles in advance. Whenever a new vehicle is made available for sale, therefore, it is necessary to store the width of the vehicle and, as a consequence, development cost cannot be reduced. Further, since it is required that detection relating to all vehicles be performed when calculating vehicle-to-vehicle distance, processing time cannot be shortened.

SUMMARY OF THE INVENTION

An object of the present invention is to provide a vehicle-to-vehicle distance calculation apparatus capable of shortening processing time while lowering cost of development.

A vehicle-to-vehicle distance calculation apparatus according to the present invention comprises: an imaging control device (imaging control means) for controlling a camera, which has been mounted on one's own vehicle, so as to image a target vehicle present ahead of one's own vehicle; a vehicle group decision device (vehicle group decision means) for deciding to what group the target vehicle belongs based upon an image obtained by imaging by the camera; a target vehicle pixel count calculation device (target vehicle pixel count calculation means) for calculating number of width or height pixels of a target image contained in an image obtained by imaging by the camera; and a distance calculation device (distance calculation means) for calculating the distance to the target vehicle based upon a representative vehicle width or vehicle height of the vehicle group decided by the vehicle group decision device, the number of pixels calculated by the target vehicle pixel count calculation device and the number of width or height pixels of the image obtained by imaging by the camera.

The invention also provides a vehicle-to-vehicle distance calculation method. Specifically, the invention provides a method of calculating vehicle-to-vehicle distance, comprising steps of: controlling a camera, which has been mounted on one's own vehicle, so as to image a target vehicle present ahead of one's own vehicle; deciding to what group the target vehicle belongs based upon an image obtained by imaging by the camera; calculating number of width or height pixels of a target image contained in an image obtained by imaging by the camera; and calculating the distance to the target vehicle based upon a representative vehicle width or vehicle height of the vehicle group decided, the number of pixels calculated and the number of width or height pixels of the image obtained by imaging by the camera.

In accordance with the present invention, a target vehicle located ahead of one's own vehicle is imaged and to what vehicle group the target vehicle belongs is decided from the image obtained by imaging. Further, the number of width or height pixels of the image of the target vehicle contained in the image obtained by imaging is calculated. The distance from one's own vehicle (camera) to the target vehicle is calculated based upon a representative vehicle width or vehicle height of the vehicle group decided, the calculated number of width or height pixels of the target vehicle and the number of width or height pixels of the image obtained by imaging. A vehicle group is a group classified according to the width or height of a vehicle such as a light-duty automobile, standard passenger car, heavy-duty vehicle such as a truck or bus, motorcycle or bicycle and can be said to correspond to the class of driver's license. In accordance with the present invention, to what group a target vehicle belongs is decided and the distance to the target vehicle is calculated utilizing the representative vehicle width or height of the vehicle group decided. This means that it is unnecessary to store beforehand the widths, etc., of all vehicles. Cost of development can be held down. In addition, processing time can be curtailed because it is unnecessary to find to which vehicle among all previously stored vehicles the target vehicle corresponds.

The apparatus may further comprise a vehicle memory in which representative vehicle widths or vehicle heights have been stored beforehand on a per-vehicle-group basis. In this case, the distance calculation device would calculate the distance to the target vehicle based upon a representative vehicle width or vehicle height of the vehicle group, which has been decided by the vehicle group decision device, from among the representative vehicle widths or vehicle heights that have been stored in the vehicle memory, the number of pixels calculated by the target vehicle pixel count calculation device and the number of width or height pixels of the image obtained by imaging by the camera.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is an example of a vehicle group table;

FIGS. 5A and 5B illustrate relationships between one's own vehicle and a target vehicle.

DESCRIPTION OF THE PREFERRED EMBODIMENT

Figure 1:
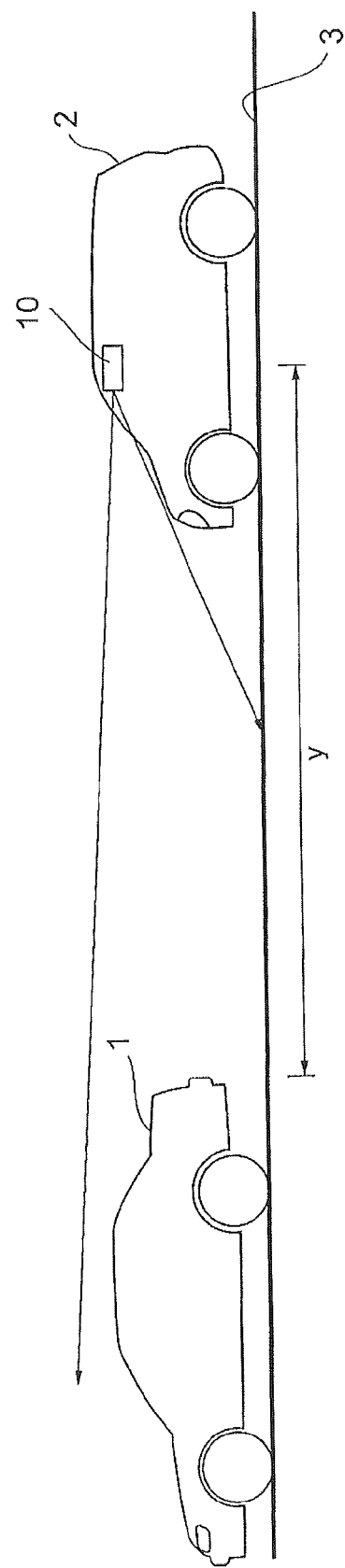
FIG. 1 illustrates the relationship between one's own vehicle and a target vehicle.

FIG. 1 represents in side view the relationship between one's own vehicle 2 and a target vehicle 1 traveling ahead of the vehicle 2.

One's own vehicle (an automotive vehicle 2) is traveling on a road 3 and the target vehicle (an automotive vehicle) 1, whose vehicle-to-vehicle distance y is to be calculated, is traveling ahead of one's own vehicle 2.

A camera 10 is mounted within one's own vehicle 2 at the forward end near the top of the vehicle. The target vehicle 1 traveling ahead is imaged by the camera 2. The vehicle-to-vehicle distance y from one's own vehicle 2 (camera 10) to the target vehicle 1 is calculated based upon the captured image. It goes without saying that since the vehicle-to-vehicle distance y is the distance from the camera 10 to the target vehicle, it may be corrected in accordance with the length of the hood of one's own vehicle 2.

Figure 2:
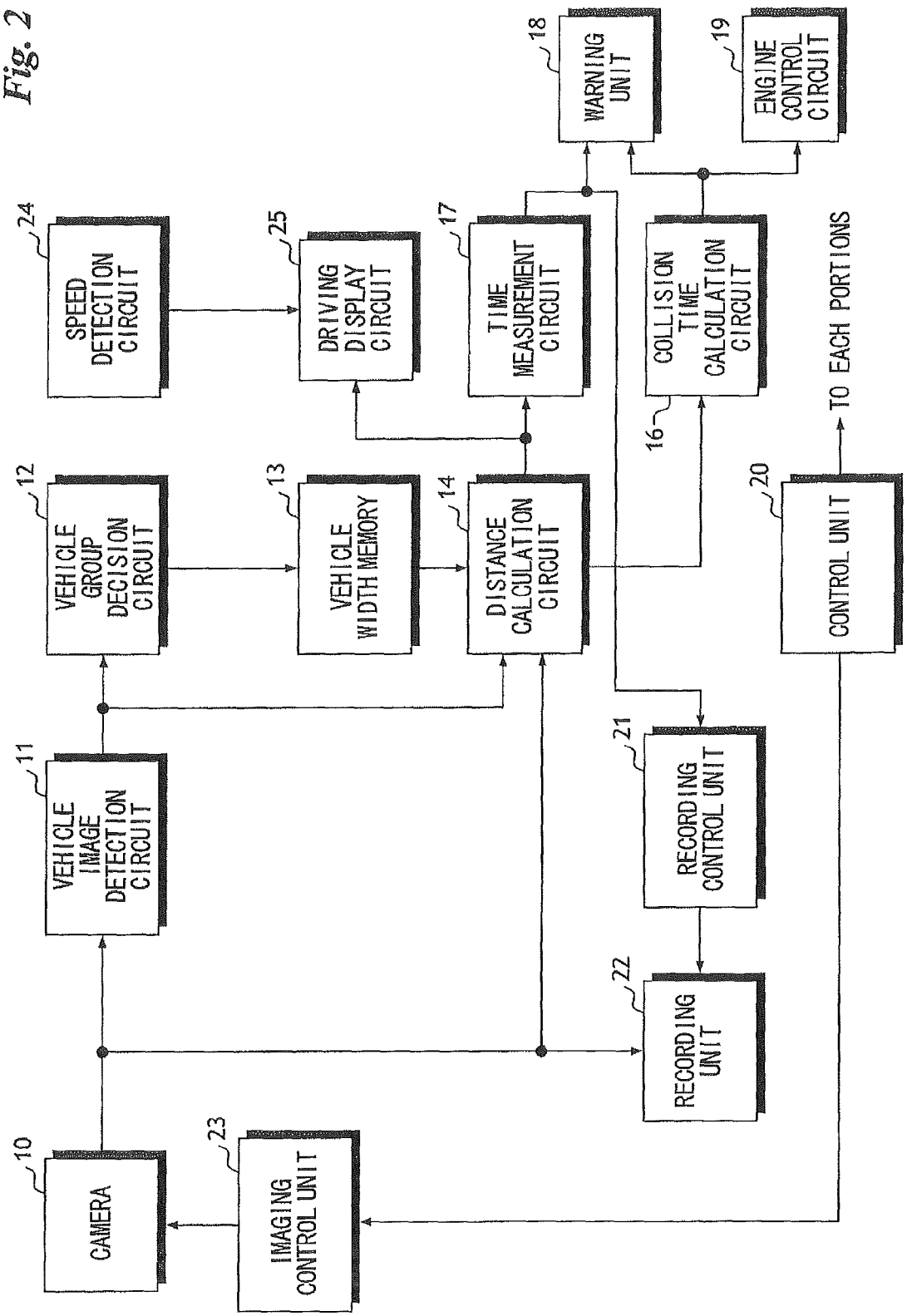
FIG. 2 is a block diagram illustrating the electrical configuration of a vehicle-to-vehicle distance calculation apparatus.

FIG. 2 is a block diagram illustrating the electrical configuration of a vehicle-to-vehicle distance calculation apparatus.

The overall operation of the vehicle-to-vehicle distance calculation apparatus is controlled by a control unit 20.

The camera 10 is controlled by an imaging control unit 23. The target vehicle 1 traveling (stopped) ahead of one's own vehicle 2 is imaged by the camera 10.

Figure 3:
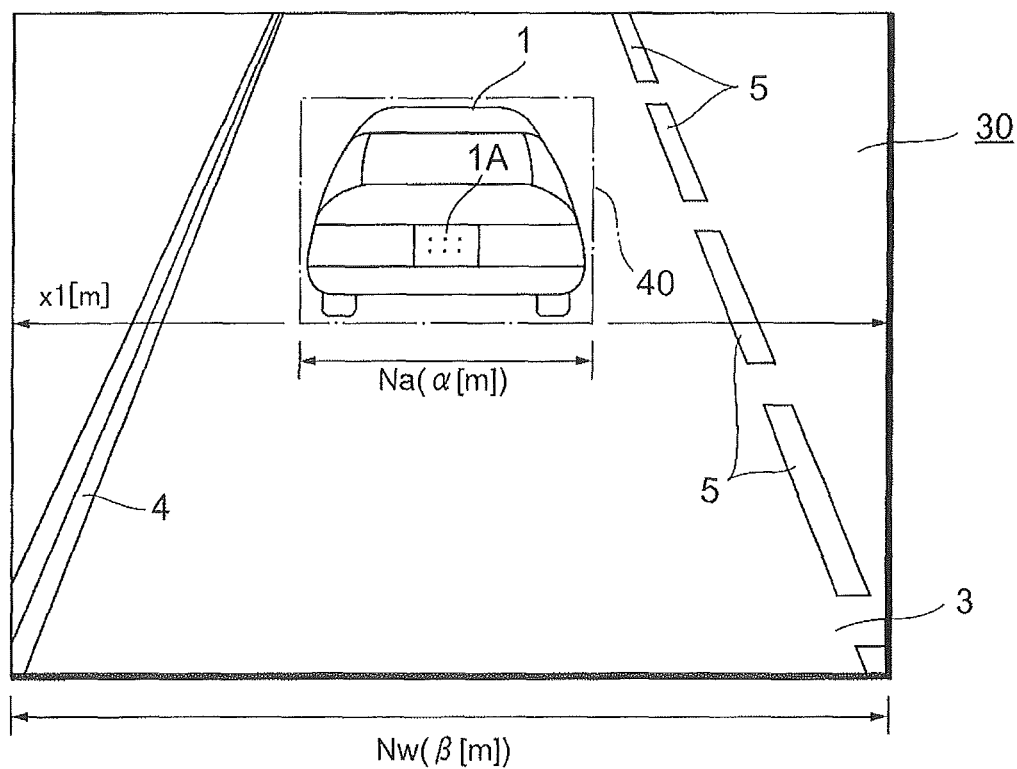
FIG. 3 is an example of an image obtained by imaging.

FIG. 3 is an example of an image 30 obtained by imaging.

In the image 30, a target-vehicle image 1 (indicated by the same reference numeral as that of the target vehicle 1) of the target vehicle 1 traveling ahead is represented on a road image 3 (indicated by the same reference numeral as that of the road 3) representing the road 3. The target-vehicle image 1 includes also an image 1A of a license plate. An image 4 of a roadway boundary block and an image 5 of the center line of the road are shown bracketing the target-vehicle image 1.

As will be described later, vehicle detection processing is executed based upon the image 30 to thereby detect the target-vehicle image 1. Also displayed in FIG. 3 is a vehicle frame 40 indicating the fact that the target-vehicle image 1 has been detected.

With reference again to FIG. 2, image data representing the image 30 captured by the camera 10 is input to a vehicle image detection circuit 11. In the vehicle image detection circuit 11, the target-vehicle image 1 is detected from within the image 30 as mentioned above. Data representing the detected target-vehicle image 1 is applied to a vehicle group decision circuit 12.

The vehicle group decision circuit 12 detects the vehicle group of the target vehicle 1, which is traveling ahead of one's own vehicle 2, from the entered data representing the target-vehicle image 1. (Since the vehicle group indicates the class of vehicle corresponding to vehicle size, in this embodiment groups are classified into light-duty automobiles, standard passenger cars, heavy-duty vehicles such as truck or bus, motorcycles or bicycles.) When the vehicle group is decided, a representative width w of this vehicle group is determined by referring to FIG. 4.

FIG. 4 is an example of a vehicle group table contained in a vehicle width memory 13.

Representative vehicle widths of vehicle groups have been stored in the vehicle table in correspondence with the vehicle groups. It goes without saying that the vehicle groups that have been stored in the vehicle group table correspond to vehicle groups that can be decided in the vehicle group decision circuit 12. Vehicle widths w1, w2, w3, w4 and w5 have been stored in correspondence with the vehicle groups, namely light-duty automobile, standard passenger car, heavy-duty vehicle (truck or bus), motorcycle and bicycle.

When the data representing the vehicle group decided in the vehicle group decision circuit 12 is input to the vehicle width memory (vehicle memory) 13, the data representing the representative vehicle width corresponding to this vehicle group is output from the vehicle width memory 13. The data representing the vehicle width is applied to a distance calculation circuit 14.

When the vehicle group is decided, a number Na of pixels indicative of the width of the bottom side of the target-vehicle image 1 (see FIG. 3) is calculated as well.

FIG. 5A is a plan view illustrating the positional relationship between one's own vehicle 2 and the target vehicle 1 at a certain time t1. In FIG. 5A, a view angle θ of the camera 10 has been decided and a number Nw of pixels indicative of the width of the output image 30 also has been decided. If we let x1 represent the actual width capable of being imaged by the camera at the position of the rear end of target-vehicle image 1 and let y1 represent the distance from the target vehicle 1 to one's own vehicle 2, then Equation 1 below will hold.

$$y1 = x1/[2\tan(\theta/2)] \qquad \text{Equation 1}$$

Further, since Nw:x1=Na:w holds, we have Equation 2 below.

$$x1 = Nw \times w/Na \qquad \text{Equation 2}$$

Equation 3 below is obtained from Equations 1 and 2, and vehicle-to-vehicle distance y1 can be calculated from Equation 3.

$$y1 = Nw \times w/[2 \times Na \times \tan(\theta/2)] \qquad \text{Equation 3}$$

FIG. 5B is a plan view illustrating the positional relationship between one's own vehicle 2 and the target vehicle 1 at a time t2 reached upon elapse of a unit time from time t.

If we let y2 represent the vehicle-to-vehicle distance from one's own vehicle 2 to the target vehicle 1, then the vehicle-to-vehicle distance y2 can be calculated from Equation 4 below at time t2 in the manner set forth above.

$$y2 = Nw \times w/[2 \times Na \times \tan(\theta/2)] \qquad \text{Equation 4}$$

Data representing vehicle-to-vehicle distance every unit time is input to a collision time calculation circuit 16, time measurement circuit 17 and driving display circuit 25.

The time measurement circuit 17 checks to determine whether a state in which the vehicle-to-vehicle distance is less than a hazardous distance at which the danger of a collision will occur has continued to a certain extent. If this state where the vehicle-to-vehicle distance is less than the hazardous distance continues to a certain extent, data indicative of this fact is applied from the time measurement circuit 17 to a warning unit 18. The warning unit 18 issues a warning to the driver of vehicle 2 in the form of a warning tone or warning display, etc. Further, a recording control unit 21 is controlled so that the image data captured by the camera 10 is recorded in a recording unit 22 as moving image data indicative of hazardous driving and as continuous still image data.

When the data representing the vehicle-to-vehicle distance is applied to the collision time calculation circuit 16 every unit time, the collision time calculation circuit 16 predicts the time at which the vehicle-to-vehicle distance will become zero. If the collision prediction time reaches a predetermined time, the collision time calculation circuit 16 applies data to this effect to the warning unit 18. The warning unit 18 issues a warning in the manner described above. Further, an engine control circuit 19 is controlled in such a manner that a collision will not occur, and the speed of one's own vehicle 2 is thus diminished.

Further, the speed of one's own vehicle 2 is detected by a speed detection circuit 24. Data indicating the detected speed is applied to the driving display circuit 25.

The driving display circuit 25 displays a graph indicative of a driver's driving tendency, which indicates the relationship between the traveling speed of one's own vehicle 2 and vehicle-to-vehicle distance.

Figure 6:
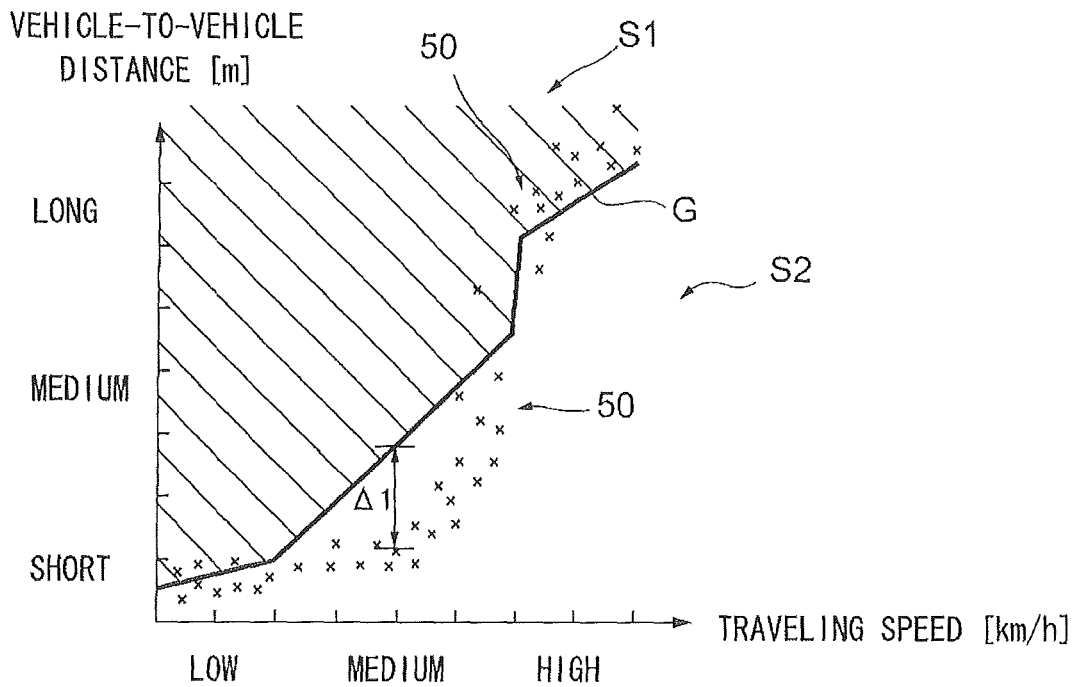
FIGS. 6 and 7 illustrate driving tendencies.
Figure 7:
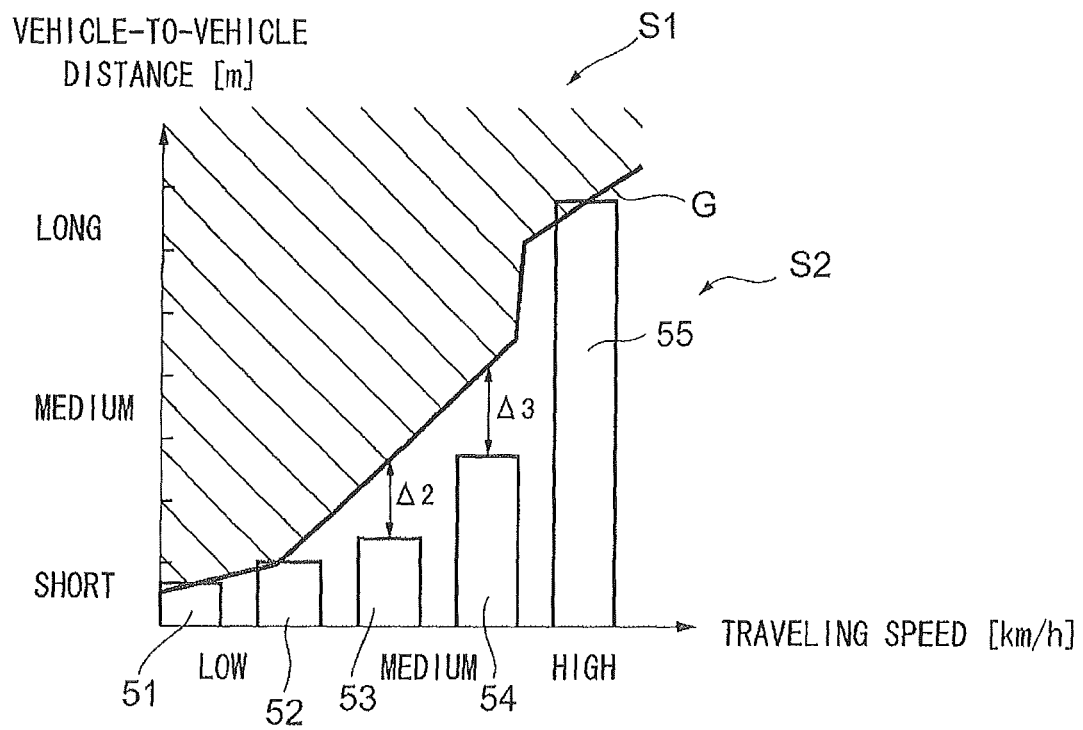

FIGS. 6 and 7 are examples of displays of driving tendency. In both examples the horizontal axis is a plot of traveling speed and the vertical axis a plot of vehicle-to-vehicle distance.

In FIGS. 6 and 7, a graph G indicates a relationship, which is considered safe for driving, between traveling speed and vehicle-to-vehicle distance.

The relationship between traveling speed and vehicle-to-vehicle distance illustrated by graph G changes depending upon the traveling speed. If traveling speed is low, a comparatively short vehicle-to-vehicle distance is acceptable. If traveling speed is medium, however, then a comparatively greater vehicle-to-vehicle distance is necessary. When traveling speed is high, a long vehicle-to-vehicle distance is necessary.

If vehicle-to-vehicle distance is greater than the vehicle-to-vehicle distance indicated by graph G such that the relationship between vehicle-to-vehicle distance and traveling speed falls within a region S1 indicated by the hatching, then this is indicative of a safe driving pattern. On the other hand, if the relationship between vehicle-to-vehicle distance and traveling speed falls within a region S2 so that the vehicle-to-vehicle distance is less than the vehicle-to-vehicle distance indicated by graph G, then this is indicative of a hazardous driving pattern. These patterns are obtained in conformity with traveling speed.

FIG. 6 illustrates safe driving and hazardous driving tendencies based upon a scatter diagram.

A number of points 50 indicating the relationship between traveling speed and vehicle-to-vehicle distance are illustrated as mentioned above. The driving tendency of the driver can be understood in accordance with the distribution of the points 50. In cases where traveling speed is low in FIG. 6, the driver is engaged in substantially safe driving, but when traveling speed rises to the medium level, the vehicle-to-vehicle distance shortens and the tendency indicated is one of hazardous driving. Further, it will be understood that when traveling speed is high, the vehicle-to-vehicle distance becomes long and the tendency indicated is one of safe driving. For example, an arrangement may be adopted in which a difference $\Delta 1$ between a required vehicle-to-vehicle distance and the actual vehicle-to-vehicle distance is calculated at a specific traveling speed and the driver is notified of the existence of this difference $\Delta 1$.

FIG. 7 illustrates driver tendency using a bar graph.

The relationship between traveling speed and vehicle-to-vehicle distance is illustrated by multiple bars 51 to 55 of the bar graph. It will be understood that whereas bars 51, 52 which result when traveling speed is low indicate that the necessary vehicle-to-vehicle distance exists, bars 53, 54 which result when traveling speed is medium indicate that the vehicle-to-vehicle distance is shorter than the necessary vehicle-to-vehicle distance and, hence, that driving is hazardous. Further, it will be understood that bar 55 which results when traveling speed is high indicates that the vehicle-to-vehicle distance is the necessary vehicle-to-vehicle distance and that driving is comparatively safe.

The driving tendency of the driver is thus displayed by the driving display circuit 25. The driver can dedicate himself to safe driving while viewing the display.

Further, an arrangement may be adopted in which data indicating the relationship between calculated traveling speed and vehicle-to-vehicle distance is extracted and the above-described driving display is presented at the driver's home or office or the like at the conclusion of driving.

In the foregoing embodiment, the vehicle group of a target vehicle is decided from the width of a target-vehicle image and distance to the target vehicle is calculated based upon the vehicle width that corresponds to the vehicle group decided. However, an arrangement may be adopted in which the height of the target-vehicle image is detected, the group of the target vehicle is decided from the detected height, and the distance to the target vehicle is calculated based upon the vehicle height that corresponds to the vehicle group decided. In this case, rather than the vehicle width memory 13, use would be made of a vehicle height memory in which a vehicle height has been stored for every vehicle group.

A license plate differs for every vehicle group such as light-duty vehicle, standard passenger car and heavy-duty vehicle. The vehicle image detection circuit 11 may therefore be adapted so as to detect the image of the license plate of the target vehicle and decide the vehicle group of the target vehicle from the detected image of the license plate. Further, it may be so arranged that in a case where a vehicle group cannot be determined by the vehicle group decision circuit 12, the vehicle group is determined by referring to the image of the license plate.

As many apparently widely different embodiments of the present invention can be made without departing from the spirit and scope thereof, it is to be understood that the invention is not limited to the specific embodiments thereof except as defined in the appended claims.

What is claimed is:

1. A vehicle-to-vehicle distance calculation apparatus comprising:
   an imaging control device for controlling a camera, which has been mounted on one's own vehicle, so as to image a target vehicle present ahead of one's own vehicle;
   a vehicle group decision device for deciding to what group the target vehicle belongs based upon an image obtained by imaging by the camera;
   a target vehicle pixel count calculation device for calculating a number of width or height pixels of a target vehicle contained in an image obtained by imaging by the camera;
   a vehicle memory for storing at least one of representative vehicle widths and vehicle heights on a per-vehicle-group basis;
   a vehicle image detection circuit for detecting an image of a license plate of the target vehicle from an image obtained by the camera and a number of width or height pixels of the image obtained by imaging by the camera; and
   a distance calculation device for calculating a vehicle-to-vehicle distance to the target vehicle based upon a representative vehicle width or vehicle height of the vehicle group of the at least one of the representative vehicle widths and vehicle heights, which has been decided by said vehicle group decision device, from among the representative vehicle widths or vehicle heights that have been stored in said vehicle memory, the number of pixels calculated by said target vehicle pixel count calculation device, and the number of width or height pixels of the image detected by said vehicle image detection circuit, wherein said vehicle group decision device decides the vehicle group referring to the image of the license plate detected by said vehicle image detection circuit in a case where a vehicle group cannot be determined widths or heights of the target vehicle heights.

2. The apparatus according to claim 1, wherein the distance calculated by said distance calculation device is corrected based on a length of a hood of the one's own vehicle.

3. The apparatus according to claim 1, further comprising:
a check circuit for checking whether a state in which the vehicle-to-vehicle distance is less than a hazardous distance at which a danger of a collision will occur has continued for a predetermined time; and
a warning device for issuing a warning if the state where the vehicle-to-vehicle distance is less than the hazardous distance continues for the predetermined time.

4. The apparatus according to claim 3, further comprising:
a speed detection circuit for detecting a traveling speed of the one's own vehicle; and
a driving display circuit for displaying a graph indicative of a driver's driving tendency, which indicates a relationship between the traveling speed of the one's own vehicle detected by said speed detection circuit and the vehicle-to-vehicle distance calculated by said distance calculation device.

5. The apparatus according to claim 4, further comprising:
a calculation circuit for calculating a difference between a required vehicle-to-vehicle distance at a specific traveling speed in the traveling speed detected by said speed detection circuit and the distance calculated by said distance calculation device; and
a device for notifying the difference calculated by said calculation circuit.

6. The apparatus according to claim 1, further comprising:
a speed detection circuit for detecting a traveling speed of the one's own vehicle; and
a driving display circuit for displaying a graph indicative of a driver's driving tendency, which indicates a relationship between the traveling speed of the one's own vehicle detected by said speed detection circuit and the vehicle-to-vehicle distance calculated by said distance calculation device.

7. The apparatus according to claim 6, further comprising:
a calculation circuit for calculating a difference between a required vehicle-to-vehicle distance at a specific traveling speed in the traveling speed detected by said speed detection circuit and the distance calculated by said distance calculation device; and
a device for notifying the difference calculated by said calculation circuit.

8. The apparatus according to claim 1, further comprising:
a speed detection circuit for detecting a traveling speed of the one's own vehicle; and
a calculation circuit for calculating a difference between a required vehicle-to-vehicle distance at a specific traveling speed in the traveling speed detected by said speed detection circuit and the distance calculated by said distance calculation device; and a device for notifying the difference calculated by said calculation circuit.

9. A vehicle-to-vehicle distance calculation method comprising:
controlling a camera, which has been mounted on one's own vehicle, so as to image a target vehicle present ahead of one's own vehicle;
deciding to what group the target vehicle belongs based upon an image obtained by imaging by the camera;
calculating a number of width or height pixels of a target vehicle contained in an image obtained by imaging by the camera;
storing at least one of representative vehicle widths and vehicle heights on a per-vehicle-group basis a vehicle memory;
detecting the image of a license plate of the target vehicle from an image obtained by the camera and a number of width or height pixels of the image obtained by imaging by the camera; and
calculating a vehicle-to-vehicle distance to the target vehicle based upon a representative vehicle width or vehicle height of the vehicle group of the at least one of the representative vehicle widths and vehicle heights, which has been decided by said deciding, from among the representative vehicle widths or vehicle heights that have been stored in said vehicle memory, the calculated number of width or height pixels of the target vehicle, and the number of width or height pixels of the image obtained by imaging by the camera,
wherein said deciding decides the vehicle group referring to the image of the license plate detected by said detecting in a case where a vehicle group cannot be determined widths or heights of the target vehicle heights.

10. The method according to claim 9, wherein the distance calculated by calculating is corrected based on a length of a hood of the one's own vehicle.

11. The method according to claim 9, further comprising:
checking whether a state in which the vehicle-to-vehicle distance is less than a hazardous distance at which a danger of a collision will occur has continued for a predetermined time; and
issuing a warning if the state where the vehicle-to-vehicle distance is less than the hazardous distance continues for the predetermined time.

12. The method according to claim 11, further comprising:
detecting a traveling speed of the one's own vehicle; and
displaying a graph indicative of a driver's driving tendency, which indicates a relationship between the traveling speed of the one's own vehicle detected by said speed detection circuit and the vehicle-to-vehicle distance calculated by said distance calculation device.

13. The method according to claim 12, further comprising:
calculating a difference between a required vehicle-to-vehicle distance at a specific traveling speed in the traveling speed detected by said detecting a traveling speed and the distance calculated by said calculating a distance; and
notifying the difference calculated by said calculating a difference.

14. The method according to claim 9, further comprising:
detecting a traveling speed of the one's own vehicle; and
displaying a graph indicative of a driver's driving tendency, which indicates a relationship between the traveling speed of the one's own vehicle detected by said speed detection circuit and the vehicle-to-vehicle distance calculated by said distance calculation device.

15. The method according to claim 14, further comprising:
calculating a difference between a required vehicle-to-vehicle distance at a specific traveling speed in the traveling speed detected by said detecting a traveling speed and the distance calculated by said calculating a distance; and
notifying the difference calculated by said calculating a difference.

16. The method according to claim 9, further comprising:
detecting a traveling speed of the one's own vehicle; and
calculating a difference between a required vehicle-to-vehicle distance at a specific traveling speed in the traveling speed detected by said detecting a traveling speed and the distance calculated by said calculating a distance; and
notifying the difference calculated by said calculating a difference.

\* \* \* \* \*